United States Patent [19]

Desai et al.

[11] 3,920,719
[45] Nov. 18, 1975

[54] WATER-INSOLUBLE STYRYL DYESTUFFS

[75] Inventors: Nalin Binduprasad Desai, Goregaon-Bombay, India; Walter Jenny, Basel, Switzerland

[73] Assignee: Ciba-Geigy AG, Basel, Switzerland

[22] Filed: Mar. 15, 1973

[21] Appl. No.: 341,668

Related U.S. Application Data

[63] Continuation-in-part of Ser. No. 28,533, April 14, 1970, abandoned.

[30] Foreign Application Priority Data

Apr. 24, 1969 Switzerland.................. 6355/69

[52] U.S. Cl.................. 260/465 D; 8/21 C; 8/179; 260/332.1; 260/347.4; 260/455 R; 260/463
[51] Int. Cl.² ........................................ C07C 121/78
[58] Field of Search ........................... 260/465 D

[56] References Cited
UNITED STATES PATENTS

| | | | |
|---|---|---|---|
| 2,583,551 | 1/1952 | Dickey et al. | 260/465 |
| 2,583,614 | 1/1952 | Taylor et al. | 260/465 |
| 3,580,946 | 5/1971 | Anderton | 260/465 |
| 3,787,476 | 1/1974 | Rohe et al. | 260/465 |

FOREIGN PATENTS OR APPLICATIONS 1,036,079   7/1966   Switzerland

*Primary Examiner*—Lewis Gotts
*Assistant Examiner*—Dolph H. Torrence
*Attorney, Agent, or Firm*—Joseph G. Kolodny; Prabodh I. Almaula; Edward McC. Roberts

[57] ABSTRACT

Water-insoluble styryl dyestuffs of the formula

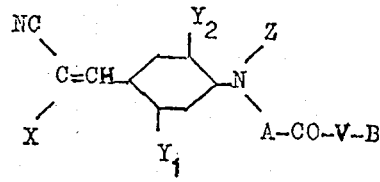

wherein X is an alkylsulphonyl, carbamyl, carbalkoxy or cyano group and B is a monovalent organic radical, A is an alkylene group which may be interrupted by a hetero-atom, $Y_1$ and $Y_2$ each represents a hydrogen or halogen atom or an alkyl or alkoxy group, $Y_1$ and $Y_2$ being identical or different from one another, Z is a substituted or unsubstituted alkyl group or can represent a radical of the formula —A—CO—V—B, V is a sulphur atom or an —NH— group or, when B is an aromatic radical an oxygen atom. The dyestuffs dye polyester fibres in fast yellow shades.

7 Claims, No Drawings

WATER-INSOLUBLE STYRYL DYESTUFFS

CROSS-REFERENCE TO RELATED APPLICATION

This application is a continuation-in-part of application Ser. No. 28,533, filed Apr. 14, 1970; now abandoned.

The present invention provides new, water-insoluble styryl dyestuffs of the formula

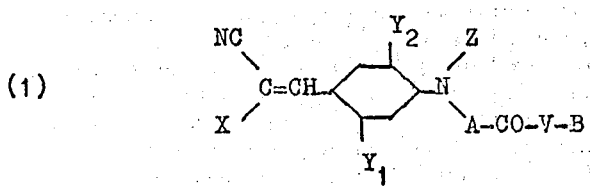

(1)

wherein X is an alkylsulphonyl, carbamyl, carbalkoxy or preferably cyano group, A is an alkylene group which may be interrupted by hetero-atoms, especially oxygen atoms, $Y_1$ and $Y_2$ each represents a hydrogen or halogen atom or an alkyl or alkoxy group, $Y_1$ and $Y_2$ being identical or different from one another, Z is a substituted or unsubstituted alkyl group or a cyclo alkyl group or preferably a radical of the formula —A—CO—V—B which is bound to the benzene ring through the nitrogen atom, V is a sulphur atom or an imino group or, when B is an aromatic radical, an oxygen atom, and B is a mono-valent organic radical, especially an alkyl, aralkyl or aromatic, alicyclic or hererocyclic radical.

A particularly preferred embodiment of the invention provides dyestuffs of the general formula

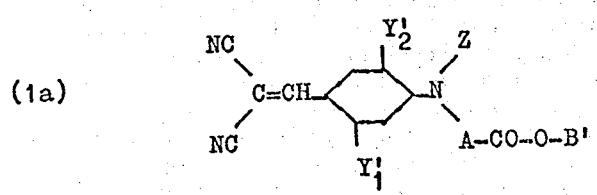

(1a)

wherein $Y_1'$ is a methyl group or a methoxy group, $Y_2'$ is a hydrogen atom or a methoxy group, Z is a substituted or unsubstituted alkyl group or the radical —A—CO—O—B' and B' is a substituted or unsubstituted benzene radical.

Styryl derivatives of the formula

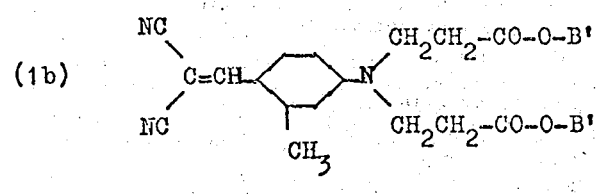

(1b)

wherein B' has the above mentioned significance, may be mentioned as the most representative examples of compounds of formula (1a).

The group Z may represent a lower alkyl group, that is to say an alkyl group containing 1 to 4, preferably 2 to 4, carbon atoms, for example a methyl, ethyl, n-propyl or n-butyl group, which can be substituted in the customary manner, for example by a benzyl or β-phenylethyl group, a halogenated alkyl group, for example a β-chloroethyl, β,β,β-trifluoromethyl or β,γ-dichloropropyl group, a β-cyanoethyl group, an alkoxyalkyl group, for example a β-ethoxyethyl or ω-methoxybutyl group, a hydroxyalkyl group, for example a β-hydroxyethyl or β,γ-dihydroxypropyl group, a nitroalkyl group, for example a β-nitroethyl group, a carbalkoxy group, a lower fatty acid acylaminoalkyl group, for example a β-(acetyl- or formyl)-aminoethyl group, a lower fatty acid acyloxyalkyl group, for example a β-acetoxyethyl, β,γ-diacetoxypropyl or butyryloxypropyl group, a β-(alkyl- or aryl)-sulphonylalkyl group, for example a β-methanesulphonylethyl, β-ethanesulphonylethyl or β-(p-chloro-benzenesulphonyl)-ethyl group, an alkyl- or aryl-carbamoyloxy-alkyl group, for example a β-methyl-carbamoyloxyethyl or β-phenyl-carbamoyloxyethyl group, an alkyl-oxycarbonyloxyalkyl group, for example a β-(methoxy-, ethoxy- or isopropoxy)-carbonyloxyethyl group, a γ-acetamidopropyl group, a β-(p-nitrophenoxy)-ethyl group, a β-(p-hydroxyphenoxy)-ethyl group, a β-[β'-cyano-, an (alkyl- or aryl)oxycarbonyl methyl group, hydroxy-, methoxy- or acetoxy)-ethoxycarbonyl]-ethyl group, a cyanoalkoxyalkyl group, a β-carboxyethyl group, a β-acetylethyl group, a β-diethylaminoethyl group, a β-cyanoacetoxyethyl group, a β-benzoyl or β-(p-alkoxy- or -phenoxy-benzoyl)-oxyethyl group. The group Z in general contains not more than 18 carbon atoms.

Suitable groups A are alkylene groups which may be interrupted by imino groups, sulphur atoms and especially oxygen atoms, for example groups of the formula —CH$_2$—, $$-CH_2CH_2-, -CH-CH_2-, -CH_2-CH-,$$
$$\quad\quad\quad\quad CH_3 \quad\quad\quad CH_3$$

—CH$_2$—CH$_2$—O—CH$_2$—, —CH$_2$CH$_2$—O—CH$_2$—CH$_2$—, —CH$_2$—CH$_2$—CH$_2$—NH—CH$_2$—, —CH$_2$—CH$_2$—SO$_2$—CH$_2$—CH$_2$—O—CH$_2$—CH$_2$—, wherein the left-hand side of the formulae is linked to the aromatic ring through the nitrogen atom.

A preferred dyestuff includes the styryl dyestuff of the formula

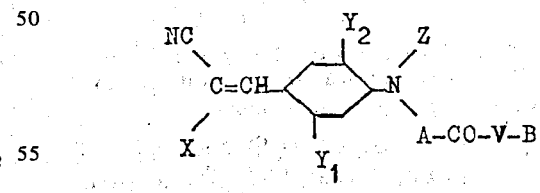

wherein X is cyano, phenylsulfonyl, $C_1$-$C_4$-carbalkoxy or $C_1$-$C_4$-carbamyl; B is unsubstituted phenyl or phenyl substituted by lower alkyl, lower alkoxy, chlorine and/or nitro; A is $C_1$-$C_3$-alkylene; $Y_1$ and $Y_2$ each represents hydrogen, alkyl or alkoxy containing up to 2 carbon atoms; Z is unsubstituted $C_1$-$C_4$-alkyl, $C_1$-$C_4$-alkyl substituted by phenyl, chlorine, cyano, phenoxy, cyanoethoxy, $C_1$-$C_4$-alkoxy, hydroxy, $C_1$-C-alkoxycarbonyl, $C_1$-$C_4$-alkylcarbonyloxy, benzoyloxy, $C_1$-$C_4$-alkyloxycarbonyloxy, phenyloxycarbonyl, phenyloxycarbonyloxy, $C_1$-$C_4$-alkylcarbamoyloxy, phenylcarbamoyloxy, acetyl or a radical of the formula A—CO—V—B; and V is sulphur, =NH— or oxygen.

A particularly preferred styryl dyestuff has the formula

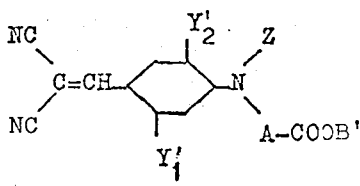

wherein $Y_1'$ is methyl or methoxy, $Y_2'$ is hydrogen or methoxy, Z is unsubstituted $C_1$-$C_4$-alkyl, $C_1$-$C_4$-alkyl substituted by phenyl, chlorine, cyano, phenoxy, cyanoethoxy, $C_1$-$C_4$-alkoxy, hydroxy, $C_1$-$C_4$-alkoxycarbonyl, $C_1$-$C_4$-alkylcarbonyloxy, benzoyloxy, $C_1$-$C_4$-alkylcarbonylamino, $C_1$-$C_4$-alkyloxycarbonyloxy, phenyloxycarbonyl, phenyloxycarbonyloxy, $C_1$-$C_4$-alkylcarbamoyloxy, phenylcarbamoyloxy, acetyl or a radical of the formula A—CO—O—B, and B is unsubstituted phenyl or phenyl substituted by lower alkyl, lower alkoxy, chlorine and/or nitro.

The new dyestuffs can be obtained by (a) condensing an aldehyde of the formula (2) 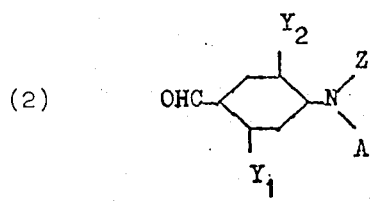

which is free from groups conferring solubility in water, or an aldimine thereof with a compound of the formula

NC—CH₂—X wherein A, B, $Y_1$, $Y_2$, Z and V in formula (2) have the significance indicated, or (b) by condensing 1 mol of a styryl derivative of the formula (3) 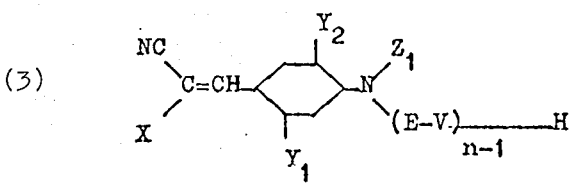

wherein A, X, $Y_1$, $Y_2$ and V have the significance indicated and $Z_1$ is a substituted or unsubstituted alkyl group, especially a group of the formula
—E—V—H,
$n = 1$ or 2 and E is an alkylene group which may be interrupted by hetero-atoms, with a halide of a carboxylic acid of the formula

Halogen —E' —CO—V—B, wherein E' is an alkyl group.

Suitable starting materials for embodiment (a) of the process according to the invention are for example aldehydes, for example the aldehyde of the formula (4) 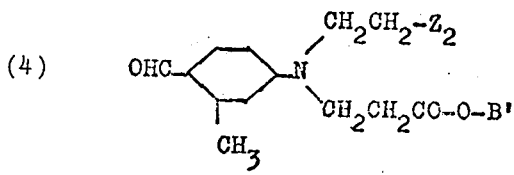

wherein $Z_2$ denotes the acyloxy radical of a lower aliphatic monocarboxylic acid or a benzoyloxy radical, a cyano radical or a cyanoethyloxy radical and B' denotes a benzene radical. The benzene radicals can possess further substituents which do not confer solubility in water, for example halogen atoms or alkyl, alkoxy or carbalkoxy groups.

The aldehydes can for example be manufactured from the following anilines: N,N-di-($\beta$-carboxymethylethoxyethyl)-aniline, N-cyanoethyl-N-carboxymethylethoxyethyl-aniline, 3-acetylamino-N-cyanoethyl-N-(carboxyethyl)-propyl-aniline, N,N-di-($\beta$-carbomethoxyethyl)-3-chloroacetylamino-aniline, N,N-di-($\beta$-carbomethoxyethyl)-m-toluidine, N,N-di-($\beta$-carbomethoxyethyl)-3-acetylamino-5-methoxy-aniline, N-ethyl-N,$\beta$-carbomethoxyethyl-3-acetylamino-aniline, N-ethyl-N,$\beta$-carbomethoxyethyl-3-ethoxyacetylamino-aniline and N-ethyl-N,m-chlorophenylpropionic acid ethyl ester.

The aldehydes can be obtained according to known processes, for example by condensation of the corresponding aldehydes with aryl- or alkyloxycarbonylalkyl halides or by condensation of the corresponding anilines, preferably the toluidines, with the addition product of N-formyl compounds of secondary aromatic amines and phosphorus oxychloride and hydrolysis of the condensation product according to Vilsmeyer, or by condensation of the acylated oxyethyl-m-toluidines with dialkylformamides according to British patent specification No. 870,454 and hydrolysis of the resulting condensation product.

The condensation of the aldehydes with the active methylene compounds, preferably malodinitrile or cyanacetic acid esters, is advantageously carried out by heating in the presence of a basic catalyst, for example ammonia, dimethylamine, diethylamine, piperidine, piperidine acetate, sodium alcoholate or potassium alcoholate, if desired in the presence of a solvent, for example methanol, ethanol, benzene, toluene, xylene, chloroform or carbon tetrachloride. When using solvents, the water produced by the reaction can be continuously removed from the reaction mixture by azeotropic distillation of the solvents, whereby the reaction equilibrium is constantly displaced in favour of the condensation product. The condensation can also take place without a basic catalyst in glacial acetic acid or some other organic acid, or in the absence of a solvent by fusing the reagents together in the presence of a basic catalyst, for example ammonium acetate or piperidine acetate.

Suitable active methylene compounds of the formula
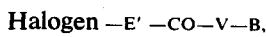
NC—CH₂—X
are for example: malonic acid dinitrile, cyanoacetic acid methyl, ethyl or butyl ester, cyanoacetamide, cyano-N-methylacetamide, cyano-N,N-dimethylacetamide, cyanoacetanilide, cyano-p- or -m-chloroacetanilide, cyano-N-cyclohexyl-acetamide, methylsulphonylacetonitrile and phenylsulphonylacetonitrile.

Instead of the aldehydes their aldimines may be used as starting materials, that is to say their condensation products with primary amines, especially aminobenzenes, i.e. the so-called Schiff bases of the formula

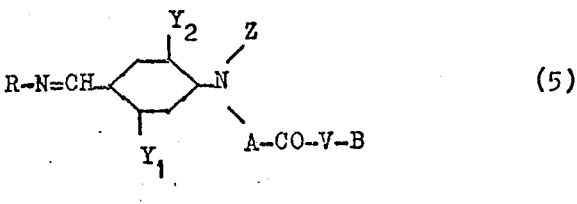 (5)

In the above formula, R preferably denotes a benzene radical, for example a phenyl radical or a sulphophenyl radical. The compounds of formula (5) can be obtained by condensation of the product of the action of formaldehyde and hydrochloric acid on an amine of the formula (6) 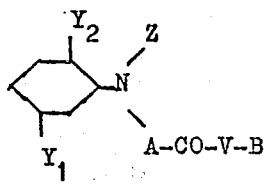

together with a nitrobenzene, for example a nitrobenzene sulphonic acid, in the presence of iron and hydrochloric acid, in accordance with Example 17 of U.S. Pat. No. 2,583,551.

According to embodiment (b) of the process according to the invention, compounds of the formulae (7a) 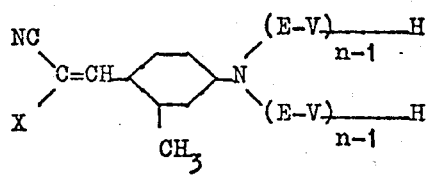

and (7b) 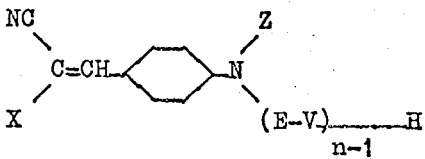

are advantageously used as starting materials.

The condensation is carried out with alkyl, aralkyl, aryl or heterocyclic esters, amides or thioesters of halogenalkanecarboxylic acids, suitable halogenalkanecarboxylic acids being, for example chloroacetic acid, α- or β-chloro- or -bromopropionic acid, α,β-dibromopropionic acid, α-bromoacrylic acid and γ-bromoacryclic acid, which together with the corresponding amines, mercaptans and especially hydroxy compounds form the corresponding amides or anilides, alkyl- or arylmercapto esters and alkyl or aryl esters.

Suitable hydroxy compounds are, for example methanol, ethanol, n-propanol, i-propanol, n-butanol, sec-butanol, isobutanol, allyl alcohol, dodecyl alcohol, ethylene glycol monomethyl ether or monoacetate, glycollic acid, cyclohexanol, furfuryl alcohol, benzyl alcohol, phenethyl alcohol, phenol, o-, m- p-cresol, o-, m-, and p-nitrophenol, o-, p- and m-chlorophenol, 2,4-dinitrophenol, o-, m- and p-methoxyphenol, 2,4,6-trichlorophenol, 1- or 2-naphthol, 8-hydroxyquinoline and 4-hydroxymethylpyridine.

Suitable amines are for example, methylamine, ethylamine, ethanolamine, propylamine, butylamine, cyclohexylamine, benzylamine, aniline, dimethylamine, diethylamine, dibutylamine, N-methylaniline, pyrrolidine, piperidine, morpholine, 2-cyanoethylamine, bis-(2-cyanoethyl)-amine, diethanolamine, ethyleneimine, N,N-dimethyl-1,3-propylenediamine, N-methylaniline, bis-(2-methoxyethyl)-amine, diisopropylamine, N-methylpiperazine, N-hydroxyethylpiperazine, aniline, o-, m- and p-chloroaniline, o-, m- and p-toluidine, o-, m- and p-nitroaniline, o-, m- and p-phenetidine, 1- and 2-aminonaphthalene, p-aminobenzoic acid methyl ester, 2-aminobenzthiazole, 2-aminothiazole, α- and β-tetrahydrofurfurylamine, α- and β-tetrahydrofurfuryl-N-methylamine, N-(α-tetrahydroxypyranylmethyl)-N-methylamine, α-tetrahydropyranyl-N-methylamine, 3-aminosulpholan, 1-carbethoxy-2-aminothiophene and 1-amino-2-carbethoxy-5-methylthiophene.

Suitable mercaptans are for example, ethylmercaptan, n-butylmercaptan, phenylmercaptan, 2-, 3- or 4-chlorophenylmercaptan, 2,4- or 2,5-dichlorophenylmercaptan, 2-, 3- or 4-methylphenylmercaptan, 2,4- or 2,5-dimethylphenylmercaptan, 2-, 3- or 4-methoxyphenylmercaptan, 2,4- or 2,5-dimethoxyphenylmercaptan, 2- or 4-nitrophenylmercaptan, 2- or 4-carbomethoxyphenylmercaptan, 2-mercaptobenzthiazole, 2-mercapto-6-chlorobenzthiazole, 2-mercapto-4-chlorobenzthiazole, 2-mercapto-4-methylbenzthiazole, 2-mercapto-6-methylbenzthiazole, 2-mercapto-6-methoxybenzthiazole, 2-mercapto-6-ethoxybenzthiazole, 2-mercaptobenzoxazole and 2-mercaptobenzimidazole.

The esterification with the halogenalkanecarboxylic acids is carried out in the customary manner, but retaining the halogen present in the alkane radical. The condensation of the resulting halogenalkanecarboxylic acid esters, amides and thioethers with the styryl derivatives of formula (3) or the corresponding aldehydes or anilines is preferably carried out in an inert organic solvent, for example pyridine, benzene, dioxane, isopropyl ether, ethyl acetate or dimethylformamide, if desired in the presence of an acid-binding agent, for example sodium carbonate or sodium hydroxide.

The new dyestuffs are excellently suitable for dyeing and printing polyester fibre material, especially polyethylene terephthalate, particularly after the dyestuffs have been converted into a finely divided form, for example by grinding, conversion into a paste, reprecipitation and the like. On such materials, pure, strong, greenish-tinged yellow dyeings which are distinguished by excellent fastness to light and sublimation are obtained according to the customary dyeing processes, for example from a dyeing liquor which contains a fine dispersion of the dyestuff and advantageously a dispersing agent at temperatures near 100°C, if desired with the addition of a swelling agent (carrier process) or at temperatures above 100°C (up to about 130°C) using excess pressure (high temperature process). This particular fastness to light is not affected by combinations, for example green combinations.

The new dyestuffs furthermore possess the advantage that they only slightly dye wool and other fibres present in the dyebath. They are therefore well suited to the dyeing of polyester-wool or, for example, polyester-triacetate mixed fabrics.

The dyestuffs according to the invention are also suitable for dyeing by the so-called thermosol process, according to which the fabric to be dyed is impregnated with an aqueous dispersion of the dyestuff which advantageously contains 1 to 50% of urea and a thickener, especially sodium alginate, preferably at temperatures of at most 60°C, and squeezed in the customary manner, for example in such a way that the impregnated material retains 50 to 100% of its starting weight of dyeing liquor. In order to fix the dyestuff, the fabric impregnated in this way is heated for example to a temperature of from 100° to 240°C, preferably from 180° to 210°C, advantageously after prior drying, for example in a stream of warm air.

The thermosol process just mentioned is of particular interest for dyeing mixed fabrics of polyester fibres and cellulose fibres, especially cotton. In this case the padding liquid also contains, in addition to the dyestuff according to the invention, a dyestuff suitable for dyeing cotton, for example a vat dyestuff. When using the latter, it is necessary to treat the padded fabric after the heat treatment with an aqueous alkaline solution of a reducing agent generally used in vat dyeing.

In the Examples which follow the parts denote parts by weight and the percentages denote percentages by weight, unless otherwise indicated.

INSTRUCTION 1

2 Equivalents of N-ethyl-m-toluidine are heated for one hour to 80° to 100°C with 1 equivalent of β-bromopropionic acid phenyl ester. The resulting tertiary amine, N-ethyl-N-phenylcarboxyethyl-m-toluidine, is purified by distillation at 180° to 200°C/0.9 mm Hg and is subsequently formylated with phosphorus oxychloride in dimethylformamide according to the process of Vilsmeyer and Haack (Berichte 60, 119 (1927)). The aldehyde of the formula

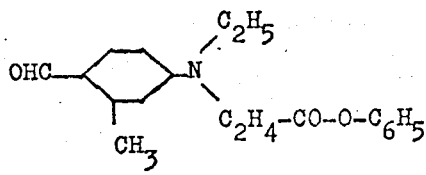

is obtained.

INSTRUCTION 2

2 Equivalents of N-ethyl-m-toluidine and one equivalent of β-bromopropionic acid anilide are heated to 100°C for 1 hour and the mixture when cold is recrystallised from dilute methanol. The resulting tertiary amine (thin, colourless needles, melting point 69° to 70°C) is formylated with hexamethylenetetramine in glacial acetic acid according to the method of Duff (J. Chem. Soc. 1952, 1159) and yields the aldehyde of the formula

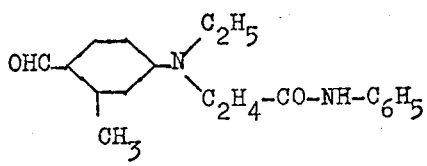

INSTRUCTION 3

Analogously to Instruction 1, N-ethyl-m-toluidine and the reaction product of thiophenol and β-bromopropionyl chloride (colourless liquid, boiling point 148° to 150°C) yields N-ethyl-N-(phenyl-thiocarboxyethyl)-m-toluidine (yellow viscous oil, boiling point 190 to 200/0.5 mm Hg) which by formylation according to Vilsmeyer and Haack leads to the aldehyde of the formula

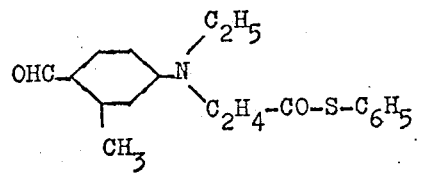

INSTRUCTION 4

The sodium salt of N-ethyl-N-(β-hydroxyethyl)-m-toluidine (1 equivalent) and 1 equivalent of chloroacetic acid phenyl ester are heated to 100°C in toluene. The resulting tertiary amine (boiling point 190 to 200/1 mm Hg) is formylated as in Instruction 1, whereby an aldehyde of the formula

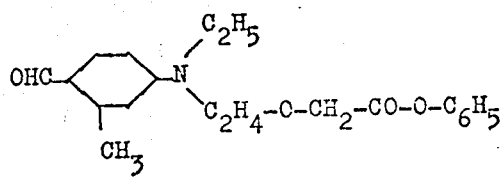

is obtained.

EXAMPLE 1

A mixture of 3.11 parts of 2-methyl-4-(N-ethyl-N-β-phenoxycarbonyl)-ethylbenzaldehyde, 0.72 part of malodinitrile, 0.003 part of piperidine and 10 parts of methanol is heated for 3 hours under reflux. After cooling, the mixture is poured into 100 parts of dilute hydrochloric acid and the dyestuff of the formula

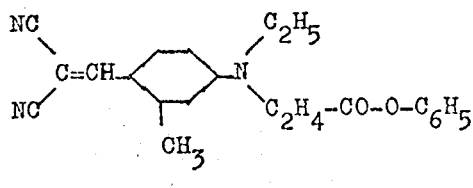

precipitates. It dyes polyester fibres yellow shades having good fastness properties.

The dyestuffs of the general formula

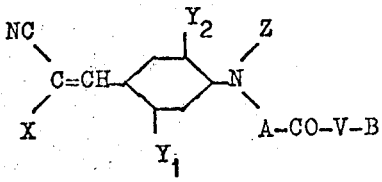

which are indicated in the Table below and which are characterised by the symbols X, $Y_1$, $Y_2$, A, V and B, are obtained in an analogous manner. The dyestuffs dye all polyester fibres in yellow shades having good fastness properties.

| Dyestuff No. | X | Z | Y₁ | Y₂ | A | V | B |
|---|---|---|---|---|---|---|---|
| 1 | NC— | —C₄H₉(—n) | —CH₃ | —H | —C₂H₄— | —O— | —C₆H₅ |
| 2 | " | —CH₂CH₂CN | H | " | " | " | " |
| 3 | " | " | " | " | —CH₂CH₂CH₂— | —NH— | —CH₃ |
| 4 | " | —C₂H₅ | —CH₃ | " | " | " | " |
| 5 | —SO₂C₆H₅ | —C₂H₄—O—C₂H₄—CN | " | " | —C₂H₄— | —O— | —C₆H₅ |
| 6 | " | —C₂H₄—O—CH₃ | " | " | " | " | " |
| 7 | NC— | —C₂H₄—OH | H | " | " | " | " |
| 8 | " | —C₂H₄—O—CO—CH₃ | " | " | " | " | " |
| 9 | " | —C₂H₄—O—CO—C₆H₅ | " | " | " | " | " |
| 10 | " | —C₂H₄—OCO—CH₂Cl | —OCH₃ | —OCH₃ | " | " | " |
| 11 | " | —C₂H₄—OCO—C₃H₇ | " | " | " | —NH— | " |
| 12 | " | C₆H₁₁ | H | H | " | " | —C₂H₅ |
| 13 | NC— | —C₂H₄—O—C₄H₉(—n) | H | H | —C₂H₄ | —NH— | —C₂H₅ |
| 14 | " | —C₂H₅ | —CH₃ | " | " | —S— | —C₆H₅ |
| 15 | " | —C₂H₄—O—CO—CH₃ | " | " | " | " | —C₆H₄—CH₃(—p) |
| 16 | " | —C₂H₄—O—C₂H₄—OCH₃ | H | " | " | " | —C₄H₉(—n) |
| 17 | " | —C₂H₄—CN | —CH₃ | " | " | " | —C₂H₅ |
| 18 | —CO—OC₂H₅ | " | " | " | " | " | " |
| 19 | " | —CH(CH₃)₂ | " | " | " | —O— | —C₆H₅ |
| 20 | " | —C₆H₁₁ | " | " | " | " | —C₆H₅—CH₃(—p) |
| 21 | —CO—O—C₂H₅ | —CH₂—C₆H₅ | " | —H | —CH₂— | " | —C₆H₅ |
| 22 | " | " | " | " | " | —NH— | – |
| 23 | " | —C₂H₅ | —OCH₃ | —OCH₃ | " | —S— | —C₂H₅ |
| 24 | NC— | —C₂H₄—Cl | —CH₃ | —H | —C₂H₄ | —O— | —C₆H₄—CH₃(—p) |
| 25 | " | —C₂H₄—CO—O—C₆H₅ | " | " | " | " | —C₆H₅ |
| 26 | " | —Cyclohexyl | " | " | " | " | " |
| 27 | —CO—O—C₄H₉ | —C₂H₄—O—CO—C₆H₄—CO—O—C₂H₅(—p) | " | " | " | " | " |
| 28 | " | —C₂H₄—OCO—C₆H₄—OCH₃(—p) | " | " | " | " | " |
| 29 | NC— | —C₂H₅ | " | " | " | " | —C₆H₄—OCH₃(—p) |
| 30 | " | " | " | —CH₃ | " | " | —C₆H₅ |
| 31 | " | " | " | " | —CH₂— | " | " |
| 32 | " | " | " | " | —C₂H₄— | " | —CH₂—CH₂<br>CH₂  CH₂<br>S<br>O O |
| 33 | NC— | —C₂H₅ | —CH₃ | —CH₃ | —C₂H₄— | —O— | CH₃—CH —CH=CH<br>O |
| 34 | " | " | " | —H | " | —NH— | —CH₂CH₂CH₂N(CH₃)₂ |
| 35 | " | " | " | " | " | " | —C₆H₄—OCH₃(—p) |
| 36 | " | " | " | " | " | " | —C₆H₄—CO—O—C₂H₅(—p) |
| 37 | " | " | " | " | " | —S— | —C₆H₃Cl₂(2,5) |

DYEING INSTRUCTION

1 Part of the dyestuff obtained according to Example 1 is ground wet with 2 parts of a 50% aqueous solution of the sodium salt of dinaphthylmethane disulphonic acid and the mixture is dried.

This dyestuff preparation is stirred with 40 parts of a 10% aqueous solution of a condensation product of octadecyl alcohol with 20 mols of ethylene oxide and 4 parts of 40% acetic acid solution are added. A dyebath of 4000 parts is prepared therefrom by dilution with water.

100 Parts of a cleaned polyester fibre material are introduced into this bath at 50°C, the temperature is raised to 120° to 130°C during half an hour, and dyeing is carried out for 1 hour at this temperature in a closed vessel. The material is then well rinsed. A strong, pure, greenish-tinged yellow dyeing of excellent fastness to light and sublimation is obtained.

EXAMPLE 2

3.1 Parts of 4-(N-ethyl-N-β-phenylcarbamoyl-ethyl)-amino-2-methylbenzaldehyde together with 0.72 part of malodinitrile, 0.003 part of piperidine and 10 parts of methanol are boiled for 3 hours under reflux. After cooling, the mixture is poured into 100 parts of dilute hydrochloric acid. The dyestuff of the formula

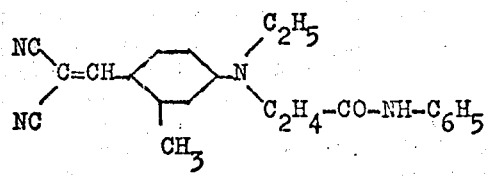

precipitates. It dyes polyester fibres in yellow shades having good fastness properties.

The dyestuff of the formula

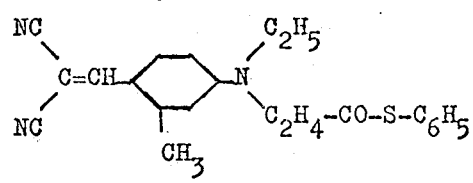

is similarly obtained from 4-(N-ethyl-N-β-phenylthiocarboxyethyl)-amino-2-methylbenzaldehyde and the dyestuff of the formula

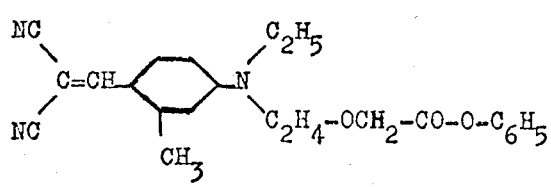

from 4-(N-ethyl-N-β-phenoxycarbonyl-methoxyethyl)-amino-2-methylbenzaldehyde. Both dyestuffs dye polyester fibres yellow shades having good fastness properties.

The embodiments of the invention in which an exclusive property or privilege is claimed are defined as follows:

1. A water-insoluble styryl dyestuff of the formula

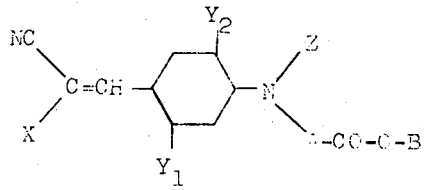

wherein X is cyano, phenylsulfonyl, $C_1$–$C_4$-carbalkoxy or $C_1$–$C_4$-carbamyl; B is unsubstituted phenyl or phenyl substituted by lower alkyl, lower alkoxy, chlorine and/or nitro; A is $C_1$–$C_3$-alkylene; $Y_1$ and $Y_2$ each represents hydrogen, alkyl or alkoxy containing up to 2 carbon atoms; Z is unsubstituted $C_1$–$C_4$-alkyl, $C_1$–$C_4$-alkyl substituted by phenyl, chlorine, cyano, phenoxy, cyanoethoxy, $C_1$–$C_4$-alkoxy, hydroxy, $C_1$–$C_4$-alkoxycarbonyl, $C_1$–$C_4$-alkylcarbonyloxy, benzoyloxy, $C_1$–$C_4$-alkylcarbonylamino, acetyl or a radical of the formula A—CO—O—B.

2. A styryl dyestuff according to claim 1 of the formula

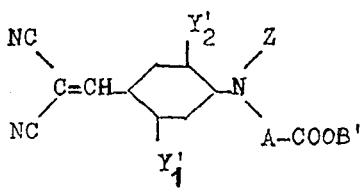

wherein $Y_1'$ is methyl or methoxy, $Y_2'$ is hydrogen or methoxy, Z is unsubstituted $C_1$–$C_4$-alkyl, $C_1$–$C_4$-alkyl substituted by phenyl, chlorine, cyano, phenoxy, cyanoethoxy, $C_1$–$C_4$-alkoxy, hydroxy, $C_1$–$C_4$-alkoxycarbonyl, $C_1$–$C_4$-alkylcarbonyloxy, benzoyloxy, acetyl or a radical of the formula A—CO—O—B', and B' is unsubstituted phenyl or phenyl substituted by lower alkyl, lower alkoxy, chlorine and/or nitro.

3. A dyestuff as claimed in claim 2 of the formula

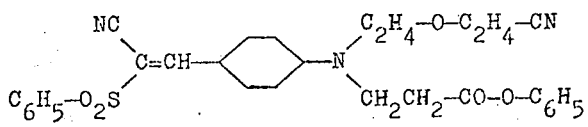

4. A dyestuff as claimed in claim 2 of the formula

5. A dyestuff of the formula

6. A dyestuff as claimed in claim 1 of the formula

7. A styryl dyestuff according to claim 2 of the formula:

wherein $Y_1$ is methyl or methoxy, $Y_2'$ is hydrogen or methoxy, Z is $C_1$–$C_4$-alkyl substituted by phenyl, chlorine, cyano, phenoxy, cyanoethoxy, $C_1$–$C_4$-alkoxy, hydroxy, $C_1$–$C_4$-alkoxycarbonyl, acetyl or a radical of the formula A—CO—O—B', and B' is unsubstituted phenyl or phenyl substituted by lower alkyl, lower alkoxy, chlorine and/or nitro.

* * * * *

UNITED STATES PATENT AND TRADEMARK OFFICE
CERTIFICATE OF CORRECTION

PATENT NO. : 3,920,719
DATED : November 18, 1975
INVENTOR(S) : NALIN BINDUPRASAD DESAI ET AL It is certified that error appears in the above-identified patent and that said Letters Patent are hereby corrected as shown below:

Column 12, claim 2, line 2, after "benzoyloxy" insert ---
$C_1$-$C_4$-alkylcarbonylamino, ---.

Column 12, claim 7, line 66, insert after "$C_1$-$C_4$-alkoxy-carbonyl," --- $C_1$-$C_4$-alkylcarbonyloxy, benzoyloxy, $C_1$-$C_4$-alkylcarbonylamino, ---.

Signed and Sealed this first Day of June 1976

[SEAL]

Attest:

RUTH C. MASON
Attesting Officer

C. MARSHALL DANN
Commissioner of Patents and Trademarks